June 1, 1965   E. A. TAYLOR, JR   3,186,034
APPARATUS FOR CONTROLLING THE APPLICATION OF HEAT
Original Filed June 12, 1961   2 Sheets-Sheet 1
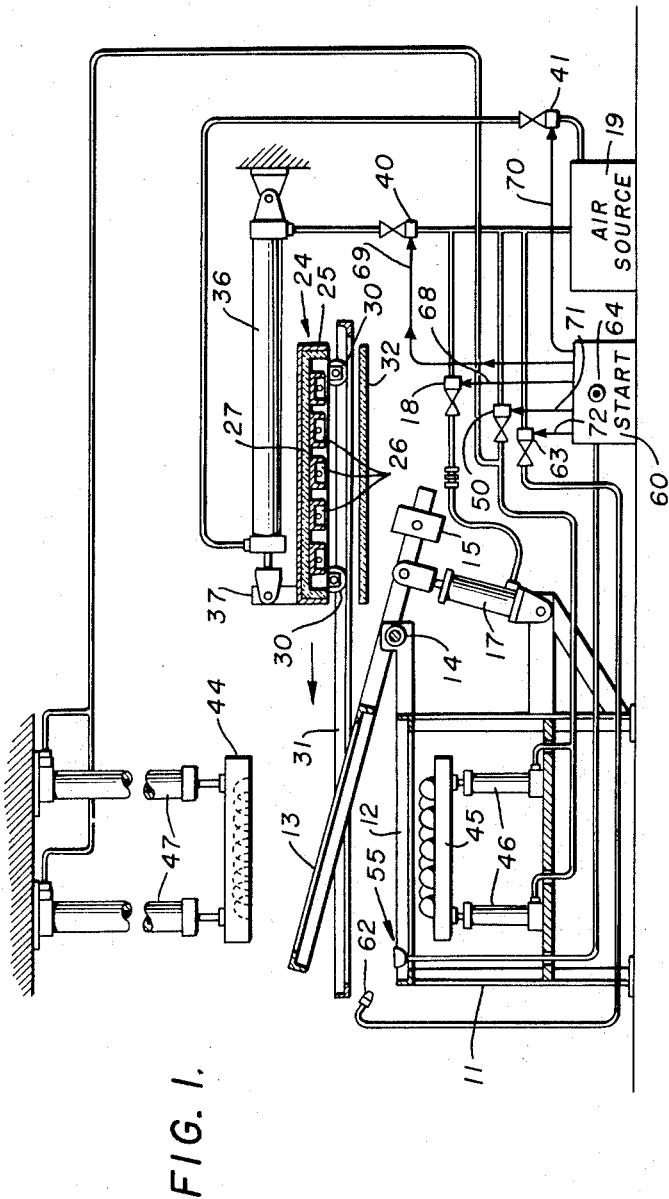
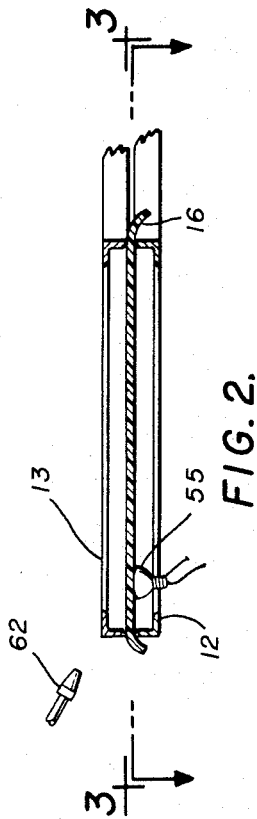
INVENTOR.
ERNEST A. TAYLOR, JR.
BY
ATTORNEY June 1, 1965   E. A. TAYLOR, JR   3,186,034
APPARATUS FOR CONTROLLING THE APPLICATION OF HEAT
Original Filed June 12, 1961   2 Sheets-Sheet 2

INVENTOR.
ERNEST A. TAYLOR, JR.
BY
*Robert L. Broad Jr.*
ATTORNEY

United States Patent Office 3,186,034
Patented June 1, 1965

3,186,034
APPARATUS FOR CONTROLLING THE APPLICATION OF HEAT
Ernest A. Taylor, Jr., Decatur, Ala., assignor, by mesne assignments, to Monsanto Company, a corporation of Delaware
Original application June 12, 1961, Ser. No. 116,536, now Patent No. 3,127,494, dated Mar. 31, 1964. Divided and this application Mar. 6, 1964, Ser. No. 350,022
4 Claims. (Cl. 18—19)

This is a division of application Serial No. 116,536, filed June 12, 1961, by Ernest A Taylor, Jr., for "Apparatus for Controlling the Application of Heat," and now Patent No. 3,127,494, granted March 31, 1964.

This invention relates to apparatus for controlling the application of heat and more particularly to apparatus for controlling a heater in response to the heat output of the heater.

In the treatment of certain fabrics or sheet materials a heating operation is necessary to achieve a desired result. In some cases, a fabric is heated for the purpose of drying it. In other cases a yarn may be heated to achieve a crimp or curl or to set a crimp or curl. In still other operations, a thermoplastic fabric which is to be molded is heated prior to the molding operation. In all of these and other operations, with the possible exception of the drying operation, it is highly desirable to control the amount of heat applied to the yarn, sheet or fabric within fairly precise limits. This presents a problem, since no convenient or accurate method of measuring the temperature rise of a yarn or fabric has been found. As a result, it has been very difficult to determine the point at which the application of heat to a fabric should be stopped, especially when short dwell times and high temperatures are encountered. With this in mind, one of the objects of this invention is to provide a novel and improved system for determining heat input to a material.

Another object of this invention is to provide an apparatus for gaging the temperature of a material by measuring the heat input to the material.

A further object of this invention is to provide an apparatus for heating and molding a fabric wherein the heating cycle is controlled by the change in temperature of a reference heat absorber.

Still another object of this invention is to provide an apparatus for heating and molding a sheet wherein a temperature sensitive element senses the heat applied to the sheet and stops the heating cycle when a predtermined amount of heat has been applied.

One embodiment of the present invention contemplates an apparatus where a heat sensitive element senses the heat applied to a sheet material and, when a predetermined amount of heat has been applied, withdraws a movable heater to stop the heating cycle, whereupon a molding operation is performed on the fabric. Since the amount of heat applied will determine the temperature of the heat sensitive element, this temperature is utilized to control the heating cycle. The heat sensitive element is cooled to a predetermined temperature before each cycle.

FIGURE 1 is a side view of an apparatus illustrating one embodiment of the invention and showing a heater in its inoperative position and a fabric-holding frame in its open position prior to commencement of a moldng operation;

FIGURE 2 is an enlarged fragmentary, sectional view showing the fabric-holding frame closed on a fabric to be treated;

Figure 3:
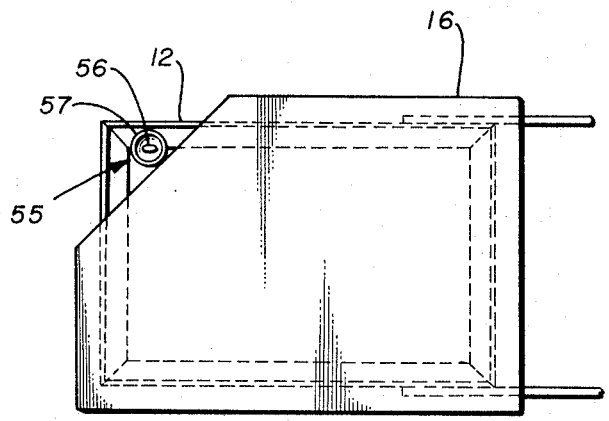
FIGURE 3 is a reduced sectional view taken on line 3—3 of FIGURE 2 showing the position of the heat sensing unit.

Referring now in detail to the drawing, a framework 11 supports a fabric-holding frame having a lower section 12 and an upper section 13 which is pivotally mounted on a rod 14 secured to the lower section 12, the upper section 13 being counterbalanced by a weight 15. The lower section 12 is secured to the framework 11 and both sections are fabricated from angle iron stock. The purpose of the frame is to hold a thermoplastic fabric 16 which is to be heated and molded. The fabric 16 is held between the closed sections 12 and 13 as best shown in FIGURE 2. Spring return air cylinders 17 (only one is shown) connected through a solenoid valve 18 to a source 19 of compressed air serve to hold the sections 12 and 13 in their closed position.

A movably mounted heater 24 (FIGURE 1) is provided for heating the fabric 16 prior to the molding operation. The heater 24 includes a shell 25 having a plurality of infrared heat lamps 26 mounted thereon, the heat lamps being positioned to direct heat downward onto the fabric 16. The inside of the shell 25 is covered by heat insulation 27. The heater, which is continuously operated, is provided with rollers 20 which are positioned on a track 31 supported above the framework 11. This provides for movement of the heater 24 from the inoperative position shown in FIGURE 1 into operative position above the fabric 16. A heat shield 32 made from glass fibers in a well known way is positioned as shown to absorb heat and thereby prevent damage to the apparatus when the heater 24 is in its inoperative position. The heater 24 is moved from one position to another by an air cylinder 36 connected to a bracket 37 attached to the heater shell 25. Copressed air is supplied to the cylinder 36 through solenoid valves 40 and 41.

Upper and lower molds 44 and 45 are provided for molding the heated thermoplastic fabric 16 into any predetermined desirable configuration. The lower mold 45 is supported by spring return air cylinders 46 which raise it into cooperation wtih the upper mold 44, while the upper mold 44 is supported by spring return air cylinders 47 which lower it into cooperation wtih the lower mold 45. The strokes of the air cylinders 46 and 47 are such that the upper and lower molds meet at the fabric 16 to correctly form it. A solenoid valve 50 controls the flow of air from the source 19 to the air cylinders 46 and 47. The cylinders 46 and 47, which are of a well known construction, are spring loaded internally so that when the valve 50 is closed to disconnect the air source 19, the molds 44 and 45 are returned to their inoperative positions (FIGURE 1), the solenoid valve 50 serving to exhaust the compressed air from the cylinders 46 and 47.

The sequence of operation of the apparatus as described thus far is as follows. The operator manually positions the fabric 16 on the lower section 12 of the frame and causes the air cylinders 17 to lower the upper section 13 to firmly clamp the fabric 16 at the edges thereof. The heater 24 is moved into its operative position over the fabric 16 and, after a time interval, returned to its inoperative position. The molds 44 and 45 are then actuated to engage and mold the fabric 16.

A major disadvantage of the apparatus described thus far is that the timing of the heating cycle is very difficult. The reason for this is that the heater 24 is not always at the same temperature when it is moved into its operative position. When the heater is in its inoperative position the head shield 32 and surrounding framework absorb heat and reflect some of it back to the heater 24. Then, when the heater is moved into operative position, the relatively cold fabric 16 and surrounding structure rapidly absorb heat, thereby causing the temperature of the heater to drop. In actual practice the temperature of the heater will vary from about 800° F. to about 700° F. when moved from inoperative to operative position. Since the temperature of the heater will vary with the time it is in its inoperative position, the rate of temperature drop and the rate at whcih heat is applied to the fabric 16 will vary from cycle to cycle. Inoperative periods such as lunch time, rest periods, mold changes, etc., permit the temperature of the continuously operating heater to increase considerably. This problem of timing is overcome by the addition of the apparatus hereinafter described.

A heat sensing unit 55 is provided for measuring the heat output of the heater 24 to control the length of the heating cycle. The heat sensing unit 55 is mounted in a corner of the lower section 12 of the fabric holding frame in the corner thereof and includes a bead thermistor 56 (FIG. 4) mounted in a reflector 57. The heat sensing unit is mounted at such a level that the thermistor 56 is in the plane of the fabric 16, a corner of which is cut away to expose the unit 55 to the heater 24 as shown in FIGURE 3.

While a thermistor is primarily intended to measure temperature, it takes a finite time for the temperature of the thermistor bead to increase from its initial temperature to a given percent of its final temperature. This rate of temperature rise is affected by the heater temperature, mass of the thermistor bead, distance between the heater and thermistor bead, area of the reflector focusing heat on the bead, and other factors. The rate of temperature rise of the fabric will be affected by most of the same factors. Its rate of temperature rise, however, is not necessarily the same as that of the thermistor bead. The reflector size and shape can be adjusted so that the rate of temperature rise of the thermistor is proportional to that of the fabric. Then regardless of the heater temperature, the heat absorbed by the thermistor bead and by the fabric will be proportional. The final fabric temperature will then be the same each time. For a different weight of fabric, a different setting of the temperature controller will be required. By starting each heating cycle with the thermistor 56 at a predetermined low temperature, such as room temperature, and stopping the heating cycle when the thermistor has reached a predetermined high temperature, such as 250° F., which is not necessarily the temperature of the fabric, the same amount of heat will be applied to each piece of fabric even though the heater temperature is not constant. The setting of the temperature rise cut-off point will vary with different weights of fabric and must be determined experimentally.

The thermistor 56 is connected by two wires to a controller 60 (FIG. 1) of a well known type which is connected to the solenoid valves 18, 40, 51 and 50. The controller 60 may contain a bridge circuit (not shown) into which the thermistor 56 is connected, as well as circuits for operating the solenoid valves. This circuitry is not shown in detail, since it is will known to those skilled in the art and since various circuits may be utilized to achieve the desired result. A nozzle 62 connected through a solenoid valve 63 to the air source 19 directs a stream of cooling air on the thermistor and its associated reflector at the beginning of each heating cycle. The controller 60 serves to operate the solenoid valves 18, 40, 41, 50 and 63 in a timed sequence so that the operation is carried out automatically when the operator presses a "Start" button 64 on the controller 60, the controller being connected to the valves 18, 40, 41, 50 and 63 by circuits 68, 69, 70, 71 and 72, respectively.

Figure 4:
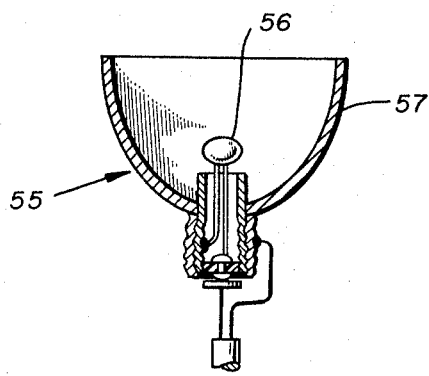
FIGURE 4 is an enlarged cross sectional view of the heat sensing unit showing its construction.
Figure 5:
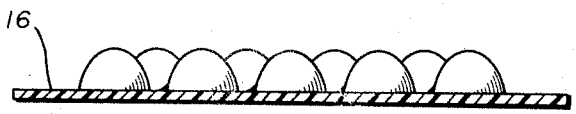
FIGURE 5 is a side view of the molded fabric.

In operating apparatus, the operator manually cuts off one corner of the fabric 16 and then manually positions it on the lower section 12 as shown in FIGURE 3. He then presses the "Start" button 64. The controller 60 applies power to the solenoid valves 18 and 63 to admit air to the cylinders 17 and to connect the nozzle 62 to the air source 19. Operation to the cylinders 17 closes the sections 12 and 13 to clamp the fabric 16 therebetween. During the closing of the sections 12 and 13 the nozzle 62 directs a stream of air onto the heat sensing unit 55 to insure that it is at room temperature at the start of the cycle. With the sections 12 and 13 closed, the controller 60 then applies power briefly to the solenoid valve 40 so that the air cylinder 36 moves the heater 24 into its operating position to start the heating cycle. As the heater 24 is moved toward its operative position the controller 60 deenergizes the solenoid valve 63 to stop the air flow from the nozzle 62.

With the heater 24 in its operative position heat is applied to both the fabric 16 and the thermistor 56, which starts each heating cycle at the same temperature. When a predetermined amount of heat has been applied to the thermistor 56 it causes the controller 60 to briefly apply power to the solenoid valve 41 to cause the air cylinder 36 to withdraw the heater to its inoperative position.

As soon as the heater 24 reaches its inoperative position, the controller 60 opens the solenoid valve 50 so that the upper and lower molds 44 and 45 move into cooperation to engage and form the fabric 16. The molds 44 and 45 remain in engagement with the fabric for a predetermined time interval, whereupon the controller 60 deenergizes the solenoid valve 50 to disconnect the spring return air cylinders 46 and 47 from the air source 19. The spring return air cylinders 46 and 47 raise the upper mold 44 and lower the lower mold 45 to clear the molded fabric 16. The molds 44 and 45 absorb enough heat from the fabric 16 that it retains its shape after the molds are withdrawn.

After the molds 44 and 45 have reached their inoperative positions (FIG. 1) the operator removes the molded fabric, replaces it with another fabric and presses the "Start" button to begin another operation.

It is to be understood that the embodiment disclosed herein may be modified or amended and that numerous other embodiments can be contemplated without departing from the spirit and scope of the invention.

What is claimed is:

1. An apparatus for molding a thermoplastic sheet, comprising a frame for holding the sheet, means mounted on the frame for molding the sheet, means on the frame for heating the sheet, and means on the frame for sensing the heat output of the heating means and for stopping the application of heat to the sheet when said heating means has applied a predetermined amount of heat to said sensing means regardless of the temperature of the heater.

2. An apparatus for molding a sheet, comprising a base, a pair of molds mounted on the base and positioned on opposite sides of the sheet to be molded, means on the base for heating the sheet, a control system for actuating the heating means, a heat sensing element positioned to receive heat from the heating means and conneced to the control system for actuating said control system to stop the heating cycle when said element has reached a predetermined temperature, and means on the base for cooling said element to a predetermined temperature after the sheet has been molded.

3. An apparatus for molding a thermoplastic fabric; comprising a base; a closable frame mounted on the base for holding a fabric to be molded; means on the base for closing the frame to grip the fabric; a heater mounted above the base and movable from an inoperative position to an operative position adjacent to the fabric; means on the base for moving the heater into and out of said operative position; a pair of molds positioned on opposite sides of the fabric; means on the base for moving the molds into cooperation to mold the fabric subsequent to the heating thereof; control means for actuating the frame closing means, the heater moving means and the mold moving means in timed relationship; and a heat sensing unit mounted on the frame adjacent to the fabric for sensing the heat output of the heater and actuating the control means to move the heater from said operative position to said inoperative position when a predetermined amount of heat has been applied to said heat sensing unit regardless of the temperature of the heater.

4. An apparatus for molding a thermoplastic fabric, comprising a base, a framework mounted on the base, a closable frame mounted on the framework for holding a fabric to be molded, a first air cylinder attached to the frame for closing said frame to grip the fabric, a track mounted above the frame, a continuously operating radiant heater having thereon rollers positioned on the track for carrying the heater from an operative position above the frame to an inoperative position away from the frame, a second air cylinder connected to the heater for moving said heater from one of said positions to the other, a pair of molds positioned on opposite sides of the fabric, a plurality of third air cylinders connected to the molds for moving said molds into engagement with the fabric, a reflector positioned on the frame adjacent to the fabric, a thermistor mounted in the reflector for receiving heat from the heater, a nozzle positioned adjacent to the reflector for directing a stream of cooling air onto the thermistor, an air source connected to the air cylinders and the nozzle, a plurality of solenoid valves for controlling the flow of air to the cylinders and the nozzle, and a controller connected to the solenoid valves for operating said valves in timed relationship, said controller also being connected to the thermistor for receiving a signal therefrom to effect a withdrawal of the heater to said inoperative position when a predetermined amount of heat has been applied to said thermistor.

References Cited by the Examiner
UNITED STATES PATENTS

| | | | |
|---|---|---|---|
| 3,025,566 | 3/62 | Kostur | 18—19 |
| 3,113,345 | 12/63 | Butzko | 18—19 |
| 3,133,314 | 5/64 | Arnould et al. | 18—19 |
| 3,153,813 | 10/64 | Swick | 18—19 |

WILLIAM J. STEPHENSON, *Primary Examiner.*

UNITED STATES PATENT OFFICE
CERTIFICATE OF CORRECTION

Patent No. 3,186,034                      June 1, 1965

Ernest A. Taylor, Jr.

It is hereby certified that error appears in the above numbered patent requiring correction and that the said Letters Patent should read as corrected below.

In the heading to the printed specification, line 8, and column 1, line 14, for "3,127,494", each occurrence, read -- 3,127,497 --; column 2, line 35, for "Copressed" read -- Compressed --; line 68, for "head" read -- heat --; column 4, line 54, for "conneced" read -- connected --.

Signed and sealed this 7th day of December 1965.

SEAL)
Attest:

ERNEST W. SWIDER                            EDWARD J. BRENNER
Attesting Officer                              Commissioner of Patents